(12) United States Patent
Wallace et al.

(10) Patent No.: US 8,336,664 B2
(45) Date of Patent: Dec. 25, 2012

(54) TELEMATICS BASIC MOBILE DEVICE SAFETY INTERLOCK

(75) Inventors: Erik Wallace, Annapolis, MD (US);
Drew Morin, Davidson, MD (US);
Lance D. Pitt, Kent, WA (US); Sean Murphy, Pleasant Hill, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 156 days.

(21) Appl. No.: 12/926,582

(22) Filed: Nov. 29, 2010

(65) Prior Publication Data
US 2012/0006611 A1    Jan. 12, 2012

Related U.S. Application Data (60) Provisional application No. 61/344,382, filed on Jul. 9, 2010, provisional application No. 61/344,381, filed on Jul. 9, 2010.

(51) Int. Cl.
*B60K 28/02* (2006.01)
*H04K 3/00* (2006.01)

(52) U.S. Cl. ............ 180/271; 180/273; 180/272; 455/1; 701/36

(58) Field of Classification Search .................. 180/271, 180/273, 272; 455/1, 565, 569.2, 63.1, 95, 455/99, 410; 340/5.2; 701/36, 45
See application file for complete search history.

(56) References Cited

U.S. PATENT DOCUMENTS

| | | |
|---|---|---|
| 3,400,222 A | 9/1968 | Nightingale |
| 4,445,118 A | 4/1984 | Taylor |
| 4,928,107 A | 5/1990 | Kuroda |
| 4,972,484 A | 11/1990 | Theile |
| 5,126,722 A | 6/1992 | Kamis |
| 5,283,570 A | 2/1994 | DeLuca |
| 5,301,354 A | 4/1994 | Schwendeman |
| 5,311,516 A | 5/1994 | Kuznicki |
| 5,327,529 A | 7/1994 | Fults |
| 5,335,246 A | 8/1994 | Yokev |
| 5,351,235 A | 9/1994 | Lahtinen |
| 5,365,451 A | 11/1994 | Wang |
| 5,418,537 A | 5/1995 | Bird |
| 5,422,813 A | 6/1995 | Schuchman |
| 5,479,408 A | 12/1995 | Will |
| 5,485,163 A | 1/1996 | Singer |
| 5,504,491 A | 4/1996 | Chapman |
| 5,506,886 A | 4/1996 | Maine |
| 5,517,199 A | 5/1996 | DiMattei |
| 5,530,655 A | 6/1996 | Lokhoff |
| 5,530,914 A | 6/1996 | McPheters |

(Continued)

OTHER PUBLICATIONS

International Search Report received in PCT/US2011/001990 dated Apr. 24, 2012.

(Continued)

*Primary Examiner* — Drew Brown
(74) *Attorney, Agent, or Firm* — William H. Bollman (57) ABSTRACT

A vehicle includes a telematics controller and a single short range, low power interior transmitter focused substantially only on a vehicle's driver's seat only. Synergistic interaction is provided between a vehicle's telematics controller and a wireless device used by the driver (e.g. a cell phone, smart phone, PDA, wireless laptop, etc.) to parametrically control at least one wireless service or other operation of a wireless device presumed operated by the driver of the vehicle. Example wireless services blocked or forced into a safe mode (such as hands-free operation) include SMS, Email, and Voice services.

17 Claims, 4 Drawing Sheets

U.S. PATENT DOCUMENTS

| | | | |
|---|---|---|---|
| 5,539,395 A | 7/1996 | Buss |
| 5,539,829 A | 7/1996 | Lokhoff |
| 5,546,445 A | 8/1996 | Dennison |
| 5,568,153 A | 10/1996 | Beliveau |
| 5,583,774 A | 12/1996 | Diesel |
| 5,594,780 A | 1/1997 | Weideman |
| 5,606,618 A | 2/1997 | Lokhoff |
| 5,629,693 A | 5/1997 | Janky |
| 5,633,630 A | 5/1997 | Park |
| 5,636,276 A | 6/1997 | Brugger |
| 5,661,652 A | 8/1997 | Sprague |
| 5,661,755 A | 8/1997 | Van de Kerkhof |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossman |
| 5,812,086 A | 9/1998 | Bertiger |
| 5,812,087 A | 9/1998 | Krasner |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,898,391 A | 4/1999 | Jeffries |
| 5,922,074 A | 7/1999 | Richard |
| 5,930,250 A | 7/1999 | Klok |
| 5,945,944 A | 8/1999 | Krasner |
| 5,946,629 A | 8/1999 | Sawyer |
| 5,950,137 A | 9/1999 | Kim |
| 5,960,362 A | 9/1999 | Grob |
| 5,983,099 A | 11/1999 | Yao |
| 5,999,124 A | 12/1999 | Sheynblat |
| 6,026,292 A | 2/2000 | Coppinger |
| 6,032,051 A | 2/2000 | Hall |
| 6,052,081 A | 4/2000 | Krasner |
| 6,058,338 A | 5/2000 | Agashe |
| 6,061,018 A | 5/2000 | Sheynblat |
| 6,064,336 A | 5/2000 | Krasner |
| 6,067,045 A | 5/2000 | Castelloe |
| 6,081,229 A | 6/2000 | Soliman |
| 6,085,320 A | 7/2000 | Kaliski, Jr. |
| 6,121,923 A | 9/2000 | King |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,147,598 A | 11/2000 | Murphy |
| 6,150,980 A | 11/2000 | Krasner |
| 6,154,172 A | 11/2000 | Piccionelli |
| 6,169,901 B1 | 1/2001 | Boucher |
| 6,169,902 B1 | 1/2001 | Kawamoto |
| 6,178,506 B1 | 1/2001 | Quick, Jr. |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski, Jr. |
| 6,195,557 B1 | 2/2001 | Havinis |
| 6,205,330 B1 | 3/2001 | Winbladh |
| 6,208,290 B1 | 3/2001 | Krasner |
| 6,215,441 B1 | 4/2001 | Moeglein |
| 6,239,742 B1 | 5/2001 | Krasner |
| 6,247,135 B1 | 6/2001 | Feague |
| 6,249,873 B1 | 6/2001 | Richard |
| 6,253,203 B1 | 6/2001 | O'Flaherty |
| 6,260,147 B1 | 7/2001 | Quick, Jr. |
| 6,275,692 B1 | 8/2001 | Skog |
| 6,275,849 B1 | 8/2001 | Ludwig |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,321,257 B1 | 11/2001 | Kotala |
| 6,324,524 B1 | 11/2001 | Lent |
| 6,327,473 B1 | 12/2001 | Soliman |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,430,504 B1 | 8/2002 | Gilbert |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison |
| 6,456,852 B2 | 9/2002 | Bar |
| 6,463,272 B1 | 10/2002 | Wallace |
| 6,473,622 B1 | 10/2002 | Meuronen |
| 6,477,150 B1 | 11/2002 | Maggenti |
| 6,504,491 B1 | 1/2003 | Christians |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,525,687 B2 | 2/2003 | Roy |
| 6,525,688 B2 | 2/2003 | Chou |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockheart |
| 6,628,233 B2 | 9/2003 | Knockheart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,687,504 B1 | 2/2004 | Raith |
| 6,690,940 B1 * | 2/2004 | Brown et al. ............... 455/456.4 |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |

| | | |
|---|---|---|
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aguilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronomeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,449 B2 | 1/2005 | Hardjono |
| 6,842,715 B1 | 1/2005 | Gaal |
| 6,853,916 B2 | 2/2005 | Fuchs |
| 6,856,282 B2 | 2/2005 | Mauro |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor et al. |
| 6,873,854 B2 | 3/2005 | Crockett et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,138 B2 | 7/2005 | Kraft |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt et al. |
| 6,996,720 B1 | 2/2006 | DeMello |
| 6,999,782 B2 | 2/2006 | Shaughnessy |
| 7,024,321 B1 | 4/2006 | Deniger |
| 7,024,393 B1 | 4/2006 | Peinado |
| 7,047,411 B1 | 5/2006 | DeMello |
| 7,064,656 B2 | 6/2006 | Bekcher |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hasen |
| 7,103,574 B1 | 9/2006 | Peinado |
| 7,106,717 B2 | 9/2006 | Rousseau |
| 7,110,773 B1 | 9/2006 | Wallace |
| 7,120,418 B2 | 10/2006 | Herajarvi |
| 7,123,874 B1 * | 10/2006 | Brennan ........................ 455/1 |
| 7,136,838 B2 | 11/2006 | Peinado |
| 7,151,946 B2 | 12/2006 | Magentni |
| 7,206,615 B2 | 4/2007 | Ochi |
| 7,209,969 B2 | 4/2007 | Lahti |
| 7,218,940 B2 | 5/2007 | Niemenna |
| 7,221,959 B2 | 5/2007 | Lindquist |
| 7,269,428 B1 | 9/2007 | Wallenius |
| 7,328,031 B2 | 2/2008 | Kraft |
| 7,356,328 B1 | 4/2008 | Espejo |
| RE42,927 E | 11/2011 | Want |
| 8,200,291 B2 * | 6/2012 | Steinmetz et al. ......... 455/569.2 |
| 2001/0006889 A1 | 7/2001 | Kraft |
| 2002/0037735 A1 | 3/2002 | Maggenti |
| 2002/0038182 A1 | 3/2002 | Wong |
| 2002/0052214 A1 | 5/2002 | Maggenti |
| 2002/0061760 A1 | 5/2002 | Maggenti |
| 2002/0069529 A1 | 6/2002 | Wieres |
| 2002/0085538 A1 | 7/2002 | Leung |
| 2002/0102999 A1 | 8/2002 | Maggenti |
| 2002/0112047 A1 | 8/2002 | Kushwaha |
| 2002/0173317 A1 | 11/2002 | Nykanen |
| 2003/0009602 A1 | 1/2003 | Jacobs |
| 2003/0037163 A1 | 2/2003 | Kitada |
| 2003/0044654 A1 | 3/2003 | Holt |
| 2003/0060214 A1 | 3/2003 | Hendry |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0118160 A1 | 6/2003 | Holt |
| 2003/0119528 A1 | 6/2003 | Pew |
| 2003/0151507 A1 | 8/2003 | Andre |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0157942 A1 | 8/2003 | Osmo |
| 2003/0161298 A1 | 8/2003 | Bergman |
| 2003/0169881 A1 | 9/2003 | Niedermeyer |
| 2003/0186709 A1 | 10/2003 | Rhodes |
| 2003/0204640 A1 | 10/2003 | Sahinaja |
| 2003/0223381 A1 | 12/2003 | Schroderus |
| 2004/0002326 A1 | 1/2004 | Maher |
| 2004/0044623 A1 | 3/2004 | Wake |
| 2004/0064550 A1 | 4/2004 | Sakata |
| 2004/0068724 A1 | 4/2004 | Gardner |
| 2004/0078694 A1 | 4/2004 | Lester |
| 2004/0090121 A1 | 5/2004 | Simonds |
| 2004/0198389 A1 | 10/2004 | Alcock |
| 2004/0203863 A1 | 10/2004 | Huomo |
| 2004/0204806 A1 | 10/2004 | Chen |
| 2004/0205151 A1 | 10/2004 | Sprigg |
| 2004/0209594 A1 * | 10/2004 | Naboulsi ................... 455/404.1 |
| 2004/0229632 A1 | 11/2004 | Flynn |
| 2005/0003797 A1 | 1/2005 | Baldwin |
| 2005/0028034 A1 | 2/2005 | Gantman |

| | | |
|---|---|---|
| 2005/0039178 A1 | 2/2005 | Marolia |
| 2005/0041578 A1 | 2/2005 | Huotari |
| 2005/0074107 A1 | 4/2005 | Renner |
| 2005/0079877 A1 | 4/2005 | Ichimura |
| 2005/0086467 A1 | 4/2005 | Asokan |
| 2005/0101338 A1 | 5/2005 | Kraft |
| 2005/0112030 A1 | 5/2005 | Gauss |
| 2005/0197775 A1 | 9/2005 | Smith |
| 2005/0209995 A1 | 9/2005 | Aksu |
| 2005/0237923 A1 | 10/2005 | Balakrishnan |
| 2005/0238156 A1 | 10/2005 | Turner |
| 2005/0259675 A1 | 11/2005 | Tuohino |
| 2005/0265536 A1 | 12/2005 | Smith |
| 2006/0010200 A1 | 1/2006 | Mousseau |
| 2006/0053225 A1 | 3/2006 | Poikleska |
| 2006/0058045 A1 | 3/2006 | Nilsen |
| 2006/0212558 A1 | 9/2006 | Sahinoja |
| 2006/0212562 A1 | 9/2006 | Kushwaha |
| 2006/0233317 A1 | 10/2006 | Coster et al. |
| 2006/0234639 A1 | 10/2006 | Kushwaha |
| 2006/0234698 A1 | 10/2006 | Folk |
| 2007/0004424 A1 | 1/2007 | Sheen |
| 2007/0021098 A1 | 1/2007 | Rhodes |
| 2007/0026854 A1 | 2/2007 | Nath |
| 2007/0030539 A1 | 2/2007 | Nath |
| 2007/0042765 A1 | 2/2007 | Bailin |
| 2007/0162942 A1 | 7/2007 | Hamynen |
| 2007/0201623 A1 | 8/2007 | Hines |
| 2008/0014964 A1 | 1/2008 | Sudit |
| 2008/0030588 A1 | 2/2008 | Boss |
| 2008/0254811 A1 | 10/2008 | Stewart |
| 2008/0268769 A1* | 10/2008 | Brown et al. .................. 455/1 |
| 2008/0293397 A1 | 11/2008 | Gajdos |
| 2009/0029675 A1* | 1/2009 | Steinmetz et al. ............ 455/410 |
| 2009/0258660 A1 | 10/2009 | Bush |
| 2010/0087137 A1 | 4/2010 | Fischer |
| 2010/0167691 A1* | 7/2010 | Howarter et al. ............. 455/410 |
| 2011/0109468 A1* | 5/2011 | Hirschfeld et al. ........... 340/670 |

OTHER PUBLICATIONS

International Search Report received in PCT/US2011/001205 dated Nov. 17, 2011.

International Search Report received in PCT/US2011/001204 dated Nov. 9, 2011.

B.W. Parkinson et al., Global Positioning System: Theory and Applications, vol. 1, Progress in Astronautics and Aeronautics, vol. 163, American Institute of Aeronautics and Astronautics, Inc., p. 184-187, 1996.

"Technology Rides Control Network to Support Short Package Applications"; Advanced Intelligent Network New. Washington, DC: Mar. 19, 1997. vol. 7, Iss. 6; p. 1.

Cellular Mobile Pricing Structures and Trends; Dr. Sam Paltridge of the OECD's Directorate for Science, Technology and Industry; Dist.: May 19, 2000 (Nov. 1999).

International Search Report received in PCT/US2011/01204 dated Aug. 17, 2012.

Kim, J.Y., et al., "An Enhanced VoIP Emergency Services Prototype," Proceedings of the 3rd International ISCRAM Conference, Newark, NJ, May 2006.

* cited by examiner

TELEMATICS BASIC MOBILE DEVICE SAFETY INTERLOCK

This application claims priority from U.S. Provisional No. 61/344,382 to Wallace et al., entitled "Telematics Basic Mobile Device Safety Interlock" filed Jul. 9, 2010; and from U.S. Provisional No. 61/344,381 to Wallace et al., entitled "Telematics Enhanced Mobile Device Safety Interlock" filed Jul. 9, 2010, the entirety of both of which are expressly incorporated herein by reference.

BACKGROUND OF THE INVENTION

1. Field of the Invention

This invention relates generally to telecommunications. More particularly, it relates to a safety interlock system blocking usage of given telecommunication services while operating a vehicle.

2. Background of the Related Art

When a mobile subscriber is a mere passenger (not the driver/operator) in any kind of ground transportation it is perfectly safe to use a mobile device to access mobile services. However, when the mobile subscriber is operating a vehicle, use of mobile services may pose a significant danger.

Studies have shown that a vehicle operator sending a text message exhibits a response time that is markedly slower than an intoxicated driver. A driver who accesses mobile services will respond slowly to a crisis, resulting in their vehicle traveling farther before stopping. Other studies published by the insurance institutes in the U.S. have shown that sending an Email or "Text Messaging" (sending an SMS message) or web browsing while operating a vehicle makes the operator less aware of their surroundings and of their vehicular situation. In fact, those same studies indicate that a person using mobile messaging services while operating a vehicle consistently demonstrated stopping distances nearly 50% longer than persons who were legally intoxicated. Messaging while operating a vehicle is more dangerous to both the vehicle operator and people nearby than drunk drivers. Even engaging in a voice conversation on a wireless device while operating a moving vehicle has been found in some studies to be just as dangerous as driving while intoxicated. But in today's mobile society, traveling via vehicle is the quintessential essence of "being mobile."

In addition to being able to make phone calls, virtually every cell phone, PDA, or smartphone on the market today is manufactured pre-installed with a Short Messaging System (SMS) (i.e., text messaging), Email, and an Internet browser application. There are currently few limitations (if any) imposed on when and where a person can send/receive a message using a mobile device. Even a wireless enabled laptop can send a text message by sending a short email to an Email address generally consisting of the target person's cell phone number "@" a domain operated by the cellular carrier. These Emails are processed by the cellular carrier and converted to SMS messages for transmission to the target person's mobile device.

In today's SMS infrastructure, the SMSC can interwork with the Usage Control Server to control time-of-day, day-of-week, number of SMS messages sent, and other static data. So at least with respect to this particular mobile service, SMS usage can currently be blocked at certain times of the day, on certain days, or after a given number of messages have been sent and/or received. However, in conventional systems there is no linkage to the SMSC or usage control server or other part of the network for any data referring to movement, motion, speed, etc. of the wireless subscriber. Today this data is at best only statically employed.

Currently, every cellular subscriber has the ability to send or receive text messages or Email from their mobile device as well as browse web sites without any imposed limitation based on when or where the user is pursuing such activities—including while they are actively operating a vehicle. As a result persons operating vehicles can access mobile services even though doing so makes them more dangerous than if they were legally intoxicated.

SUMMARY OF THE INVENTION

In accordance with the principles of the current invention, a telematics mobile device safety interlock for a vehicle comprises a short range, low power transmitter mountable within a vehicle. The short range, lower power transmitter has a range of approximately a single seat in the vehicle. A telematics controller is in communication with the short range, low power transmitter. A safety module forces a safety mode of operation of the wireless device when operated from the operator's seat.

A method of restricting use of a mobile device in a non-parked vehicle according to another aspect of the invention comprises detecting attempted use of a mobile device within an operator's seat of a vehicle. A safety interlock module is triggered to cause transmission of a block use instruction substantially toward only an operator's seat of the vehicle. The block use instruction causing the mobile device to temporarily implement restriction of use of at least one application on the mobile device from use by a driver of the vehicle.

BRIEF DESCRIPTION OF THE DRAWINGS

Features and advantages of the present invention will become apparent to those skilled in the art from the following description with reference to the drawings which.

DETAILED DESCRIPTION OF ILLUSTRATIVE EMBODIMENTS

The present inventors have appreciated that mere disablement of communication services while moving at a speed presumed to be driving would also inadvertently eliminate perfectly safe operation of similar modes of communication services for mere passengers in a vehicle. The present inventors have also appreciated that a key to achieving greater safety without unduly reducing the utility of mobile services is to detect whether or not it is the vehicle operator who is attempting to send a text message, read an email, etc., then render such usage safe, either by forcing hands-free use of that service if relevant and available, or by blocking use of that particular service for a temporary period of time (or for as long as the vehicle remains in a non-parked condition.)

One conventional definition of "telematics" may have been understood to be limited to the use of telecommunication equipment to facilitate automation(s) in automobiles (http://en.wikipedia.org/wiki/Telematics). However the etymology of the word telematics suggests that it can refer to any sharing of computer based information over some distance. As such, as used herein, a mobile device is described as being in communication with the automobile's computer system, i.e., its telematics system.

Some conventional on-board vehicle telematics systems have the ability to detect seats which are occupied, e.g., whether a driver is present in the driver's seat, and whether a front seat passenger is also present. There are a variety of technologies used to accomplish this, the most common of which is a weight sensor built into the respective seats conventionally used to determine whether or not to disarm a passenger side air bag.

Privately owned and operated vehicles constitute the most significant danger in terms of the sheer number of users who may attempt to access mobile services while operating a ground vehicle, because there are far more mobile device owners who drive automobiles than any other "vehicle operator" demographic. Blocking dangerous use of mobile devices within private vehicles has a tremendous ability to eliminate a huge percentage of the source of potential danger associated with mobile wireless services. Along this line, an embodiment of the invention (a case that constitutes the vast majority of the instances of dangerous use of mobile services while operating a vehicle) is when the vehicle operator is the solitary adult in the vehicle. Vehicles generally use weight to determine whether an occupant is an adult. Vehicle occupants whose weight is below a pre-designated value are considered "juvenile occupants". Vehicles will not arm the passenger side airbags when juveniles occupy the front side passenger seat because the airbag may constitute a greater threat to the juvenile occupant than the force vectors suffered in a front or side impact when the juvenile occupant is wearing a seatbelt.

The invention recognizes that the best way to determine whether the vehicle operator is attempting to access a mobile service while moving is for the mobile device to interact with the vehicle itself, i.e., using a telematics controller in the given vehicle. Thus, the present invention provides a handset-based safety interlock that inter-operates the wireless mobile device with a vehicle's telematics controller which has the ability to physically sense the specific seats in the vehicle that are occupied. Though possible to accomplish with trilateration methods alone, combining knowledge of seats that are occupied together with triangulation information informing which of the occupied seats is attempting operation of a restrictable service on a mobile phone, increases safety results with a higher fidelity handset-based safety interlock.

Trilateration uses range measurements from three (3) points and computes where the arcs of those three line segments intersect. There is error in trilateration, so an error ellipse in which the target is located is computed. while similar in end result to triangulation, trilateration in accordance with the principles of the present invention is not the same as triangulation. Trilateration is preferred because the antenna technology included in the passenger cabin of vehicles typically can not get accurate angular measurements. Although trilateration can be quite sensitive to noise in terms of detected range, if the receiver antenna cannot accurately measure angles then trilateration is preferred by the inventors herein. In accordance with the invention, trilateration is preferred for scenarios where the antenna within the passenger cabin cannot adequately measure angles, and triangulation may be used and is preferred for scenarios where the antenna within the passenger cabin is capable of measuring an angle.

Figure 1:
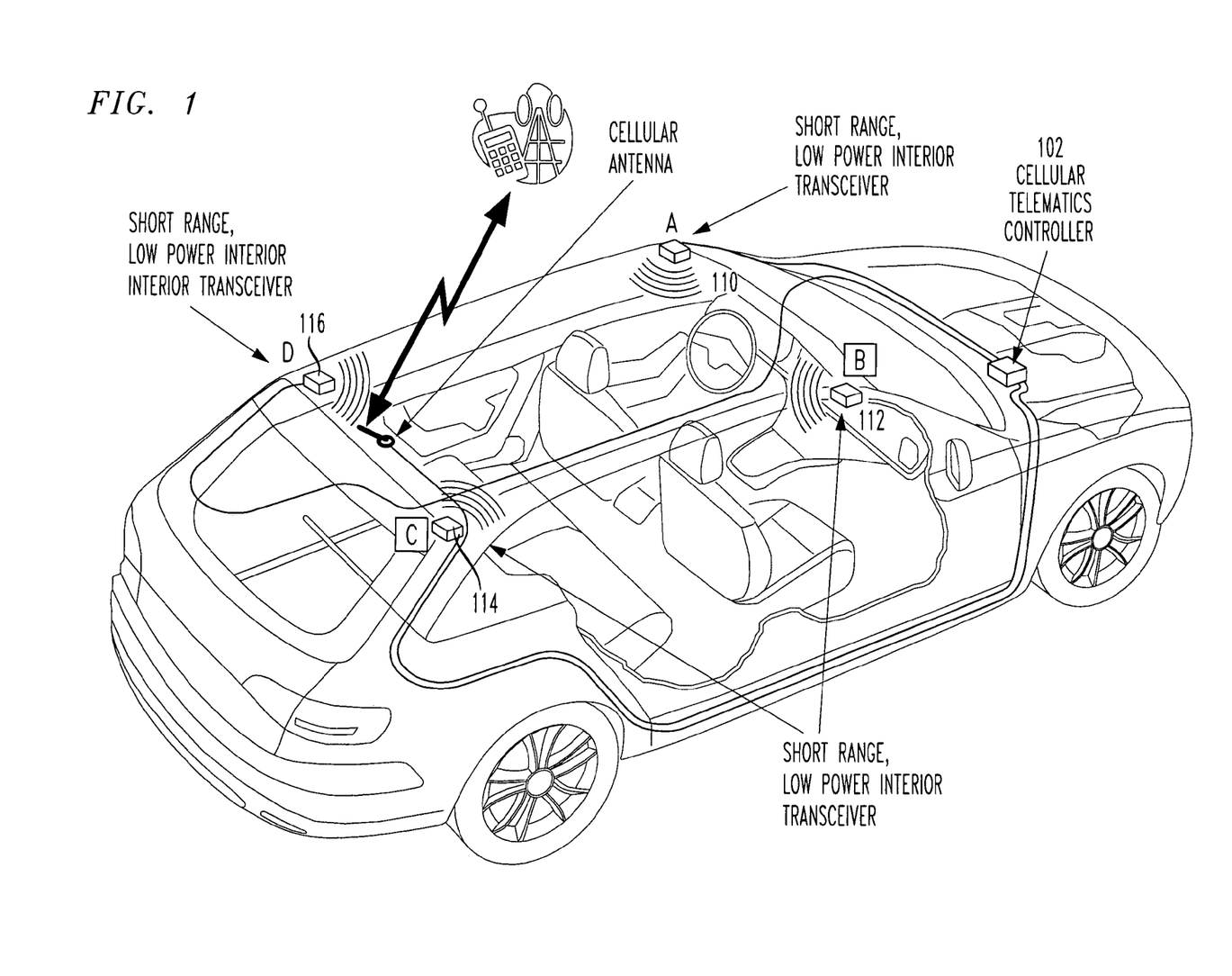
FIG. 1 shows an automobile with an enhanced mobile safety interlock installed, in accordance with the principles of the present invention.

The present invention provides synergistic interaction between a telematics controller 102 (e.g. computing for vehicles), wireless devices (e.g. cell phones, smart phones, PDAs, wireless laptops, etc.), and location infrastructure to parametrically control the use of wireless devices and associated services—including but not limited to Short Message System (e.g. "Text") messages, Email, Voice, and other client services—used by a vehicle operator.

Otherwise conventional vehicles include a variety of mechanical sensors that indicate which seats in a vehicle are occupied. In accordance with the present invention, a wireless mobile device takes advantage of features of an otherwise conventional telematics system by including a "smart safety interlock" that allows only passengers to access certain mobile services while in a moving vehicle. In the present invention mobile communication devices are enabled to interoperate with vehicle computing systems—via very short range, low power, small bandwidth communication protocols including but not limited to "Bluetooth"—so that vehicle information including but not limited to weight sensor readings can be provided to the mobile device.

FIG. 1 shows an automobile with an enhanced mobile safety interlock installed, in accordance with the principles of the present invention.

In particular, as shown in FIG. 1, a vehicle includes a telematics controller 102, and at least three short range, low power interior transceivers 110, 112, 114, 116. The short range, low power interior transceiver A 110 is shown focused on a vehicle's driver's seat only. At least two additional individual short range, low power interior transceivers B 112 and C 114 are also included, e.g., focused on a front passenger seat, and a rear passenger side seat. For increased accuracy, a short range, low power interior transceiver may be provided adjacent each passenger seat in the vehicle, which in the shown example adds a fourth rear driver side short range, low power interior transceiver D 116 focused on a driver's side rear seat.

For trilateration purposes, it is only important that at least three short range, low power transceivers (e.g., Bluetooth transceivers) be included within the vehicle. The inclusion of a plurality of short range, low power transceivers (e.g., 110-116) throughout a vehicle interior allows the vehicle's telematics system to determine with accuracy which occupant is attempting to access a given mobile service.

The telematics controller 102 includes a module which determines from seat sensors and from trilateration from among the plurality of short range, low power transceivers 110-116, a most likely occupied seat within the vehicle that is attempting to access a given mobile service (e.g., SMS, Email, etc.)

As an alternative to trilateration methods, the telematics module 102 may simply determine a closest transceiver 110-116 to a mobile device as measured by the intensity of a received RF (e.g., Bluetooth) signal, ideally to provide a 99% dependable indication of the mobile device's location within the vehicle interior.

Table 1 illustrates an exemplary method implemented by the telematics controller 102 to determine which passenger in a given vehicle is most likely using their mobile device, based upon which short range, low power interior transceiver 110-116 has the maximum signal strength with the mobile device and thus is presumed closest to the mobile device):

TABLE 1

| Passenger | Interior Transceiver "A" 110 | Interior Transceiver "B" 112 | Interior Transceiver "C" 114 | Interior Transceiver "D" 116 |
|---|---|---|---|---|
| Driver | MAX SIGNAL STRENGTH | | | |
| Front Center | max signal strength | max signal strength | | |
| Front Right | | MAX SIGNAL STRENGTH | | |
| Back Right | | | MAX SIGNAL STRENGTH | |
| Back Center | | | max signal strength | max signal strength |
| Back Left | | | | MAX SIGNAL STRENGTH |

A non-driving passenger sitting in a position between transceivers C 114 and D 116, e.g., in a position such as in the center of the back seat, may well be detected at nearly the same signal strength in two of the four interior transceivers (e.g., at transceivers C 114 and D 116). In this example this would be presumed to be a passenger sitting in a center of the back seat of the vehicle.

This 'center of the seat' possibility also exists in a front bench-seat type seat, in which case a front center passenger's mobile device will register signal strength nearly equally on transceivers A 110 and B 112. But few vehicles manufactured today have a front middle passenger seat. The RF signal (e.g., Bluetooth) strength detection at each of the transceivers 110-116 for a passenger sitting in the front center position may well be close enough to the driver's position to make it virtually impossible to articulate the difference between a passenger sitting in a front center seat and a driver. Even though use a mobile device from a front center position within the vehicle interior may be inadvertently blocked, such mobile device usage so close to the driver would likely in any event be distracting to the driver, so blockage of use of certain mobile services on a device used by a passenger sitting in the front center would be acceptable to ensure safety.

Once it is determined that a mobile device is being attempted to be used by the driver of a non-parked vehicle, safety blockage is initiated. The safety blockage may be accomplished at the mobile device itself with an appropriate instruction signal from the vehicle's telematics controller 102 via an appropriate wireless communication path (e.g., a piconet type communication such as Bluetooth) instructing the carrier servicing the mobile device to block usage of at least that particular wireless service. Alternatively, or additionally, the telematics controller 102 may communicate with the mobile device, via Bluetooth or via the wireless phone network, forcing the mobile device into a hands-free mode.

Alternatively, or additionally, service safety blockage may be implemented at the subscriber's network level by use of a "service blockage request" passed from the telematics system 102 over its own wireless telecommunications network, and routed to a pre-configured service blockage server associated either with the current carrier (if roaming) or with the carrier of the mobile device to be blocked.

Service blockage is preferably limited to a given mobile service, e.g., SMS, Email, calls, etc., and preferably is temporary, e.g., for the next several minutes. Once blockage is implemented for a given service, other services that might not be appropriate for use by a driver of a vehicle may also be blocked at that time.

Figure 2:
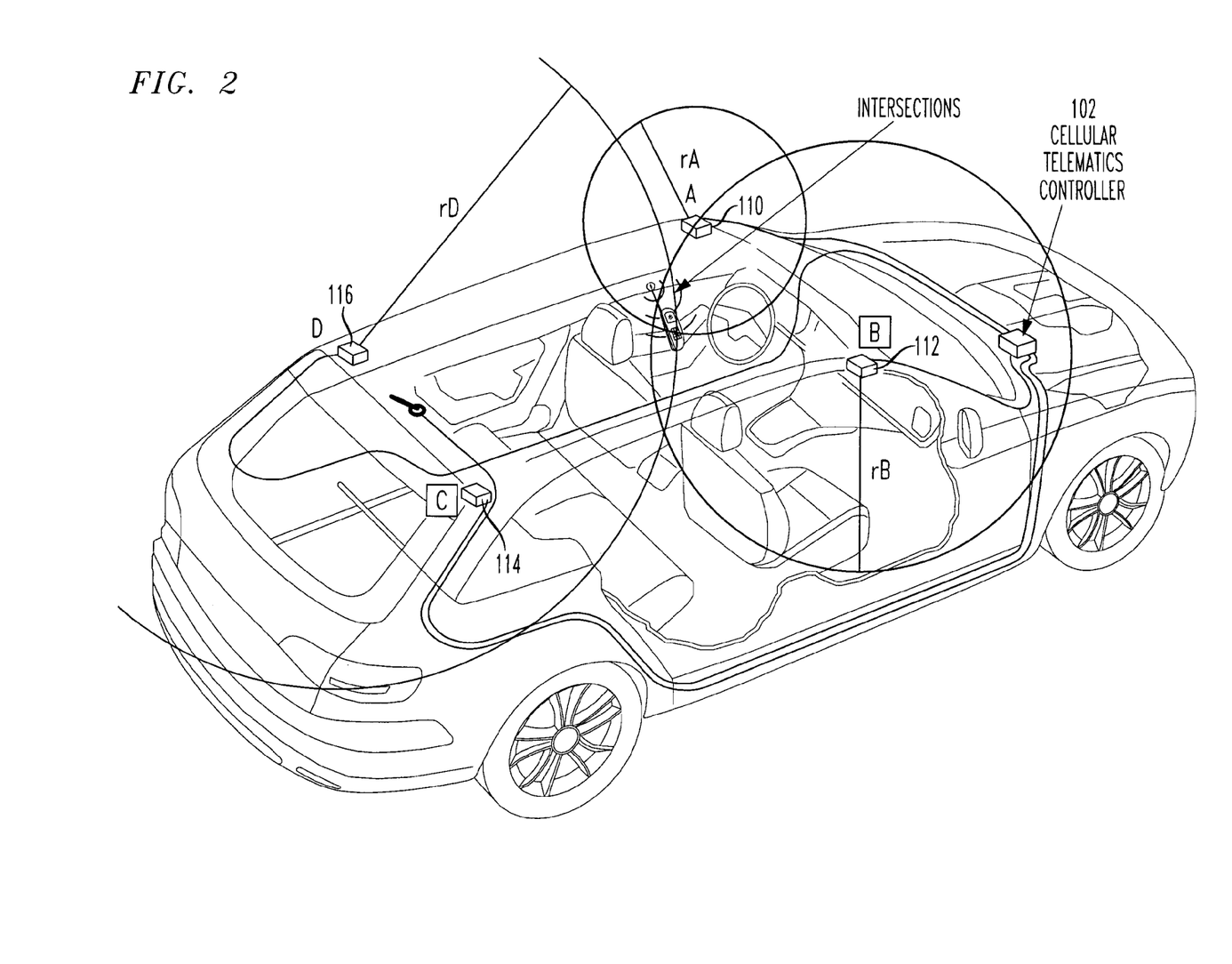
FIG. 2 shows trilateration implemented by the telematics controller shown in FIG. 1, using range measurements rA, rB and rD from seat-focused short range, low power transceivers, in accordance with the principles of the present invention.

FIG. 2 shows trilateration implemented by the telematics controller 102 shown in FIG. 1, using range measurements rA, rB and rD from seat-focused short range, low power transceivers A 110, B 112 and D 116, in accordance with the principles of the present invention.

In particular, as shown in FIG. 2, the method illustrated in Table 1 is enhanced by the use of trilateration performed within a vehicle's telematics controller 102 to accurately compute the seat location of a transmitting mobile device, as detected by reception of an RF communication signal and/or Bluetooth signal from the mobile device at each of the internal transceivers 110-116.

Echo cancellation techniques may be implemented at the transceivers 110-116 to digitally remove echoes received from an original signal from the mobile device. With echoes removed or significantly attenuated, a distance from any of the transceivers 110-116 to the transmitting mobile device may be calculated with an accurate time measurement of the same signal component of a transmission from the mobile device to each of the internal transceivers 110-116.

Although FIG. 2 shows trilateration using range measurements from Transceivers "A", "B", and "D" (i.e. "rA", "rB", and "rD") there is no reason that the location determination couldn't be made with range measurements from any subset of three (3) out of the total quantity of transceivers A-D 110-116 within the vehicle. And while disclosed embodiments show the implementation of four transceivers within the internal cavity of a vehicle, a larger vehicle with several or more seats may include additional transceivers focused on those additional seats, within the principles of the present invention.

In accordance with the principles of the present invention, at least three receivers (which may be transceivers in a more sophisticated implementation) are required to permit trilateration and calculation in a 2-dimensional plane of the location of a given active mobile device. If more than three receivers are implemented, accurate location of a mobile device within the vehicle may be obtained using any subset of at least three of the receivers.

The mathematical details of trilateration are well known to those of skill in the art (e.g., at the web site http://en_wikipedia.org/wiki/Trilateration), and thus will not be included herein.

Though trilateration may be performed for any/all mobile devices operated within a given vehicle, for the purposes of the present invention a significant improvement in safety is provided by the dependable detection of the location of only a mobile device attempted to be operated by the driver of the vehicle, and safety imposed blockage or forced hands-free operation thereof.

According to another aspect of the present invention, the short range, low power, small bandwidth communication protocol usage is mandatory for the wireless device user when within the confines of the relevant automobile. As an example, in one embodiment, the vehicle computing system has authority to start any required application within the wireless device to automatically enable Bluetooth or other communications if not already enabled within the wireless device.

Figure 3:
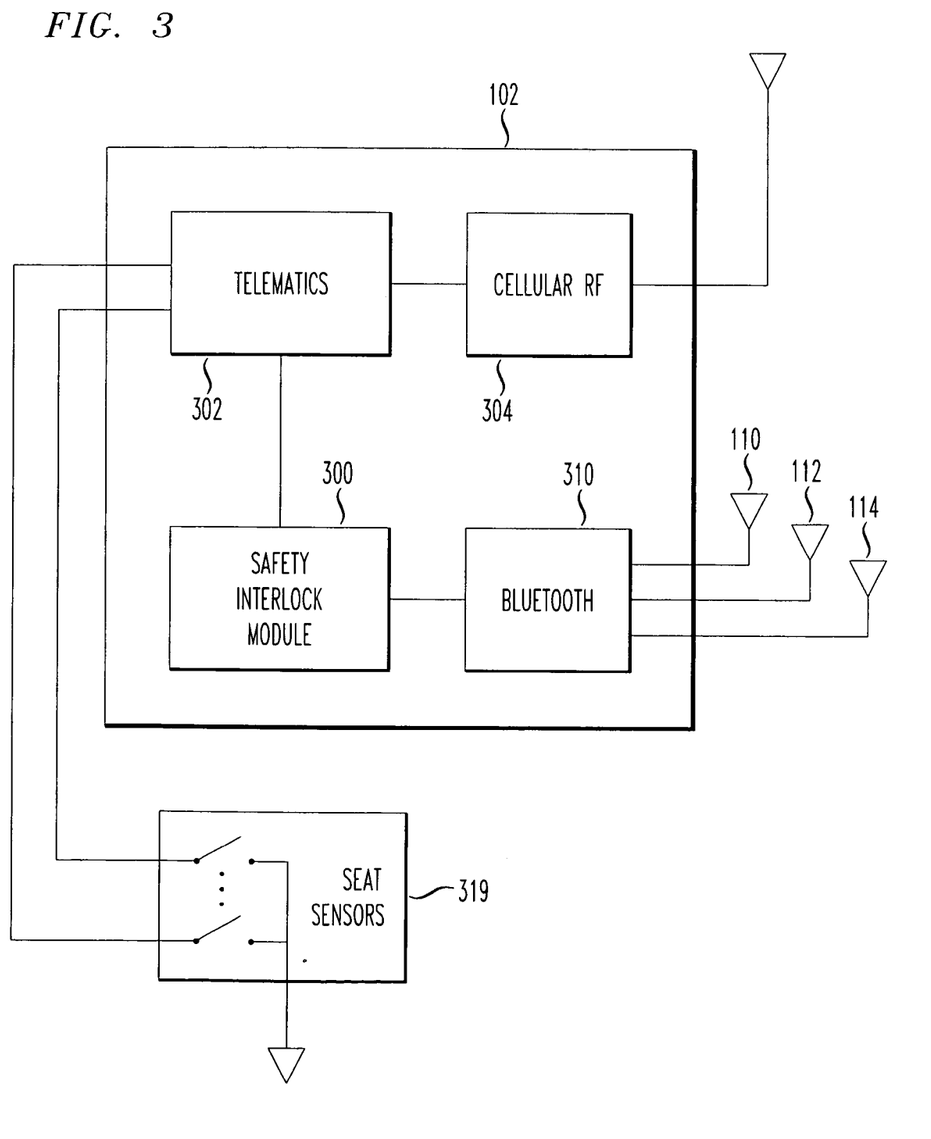
FIG. 3 depicts modules in an exemplary telematics controller, in accordance with the principles of the present invention.

FIG. 3 depicts modules in an exemplary telematics controller, in accordance with the principles of the present invention.

In particular, as shown in FIG. 3, the telematics controller 102 includes the otherwise conventional telematics module 302 and associated cellular RF front end 304. However, in accordance with the invention, the telematics controller 102 further includes a safety interlock module 300 and associated Bluetooth front end 310. Multiple antennas 110-114 are located within the operator/passenger cabin of the vehicle. Conventional seat sensors 319 are monitored by the telematics controller 102 to sense occupied seats within the vehicle.

Detection that a vehicle is driving may be derived from a non-parked indication from the telematics controller 102.

Alternatively, driving may be inferred by the wireless network itself by detection of movement of the subscriber. In particular, the cellular infrastructure has the capability to determine when a mobile device is actually moving. In accordance with the invention, a mobile device cooperates with cellular network infrastructure to detect its rate of movement and location relative to known roadways. In this way, the mobile device itself may impose safe operation by blocking its own use of certain features of the wireless mobile device, e.g., SMS, Email, and web browsing applications, and/or blocking that device's access to network mobile services, when in a moving vehicle as detected by motion. Motion or velocity is a simple function of changes in location over time, and can be determined by an on-board GPS system and/or a location determining elements of a wireless network. Every cellular mobile device, be it CDMA, TDMA, GSM, WiMAX, LTE, and even VoIP, communicates with a cellular base station. As the mobile device moves and signal quality with a current base station with which the mobile device is communicating begins to degrade, the cellular network transfers communication with that device to a different base station having better signal quality. That transfer (referred to as a "handoff") occurs again and again as the mobile device continues to move. Transfers between base stations can be used as a presumed measure of motion of the mobile device, though this is a relatively low fidelity measurement of motion. Nevertheless, it allows detection of movement of every cellular mobile device regardless of its technology, old or new. Better yet is use of an internal Global Positioning System (GPS) chipset present in most modern cellular mobile devices, allowing the wireless device to receive GPS signals and locate itself. Based on repeated GPS location information an accurate determination as to both location and speed computed. The Federal Communications Commission (FCC) has mandated that all cellular carriers be able to precisely (i.e. within 150 ft) locate mobile devices that are communicating with the carriers' cellular network(s) regardless of whether or not the mobile device is GPS enabled. All wireless carriers operating in the U.S. have added various Position Determination Equipment(s) (PDEs) to their wireless networks allowing them to accurately locate all subscribers and thus comply with the FCC mandate.

A rough determination of speed may be calculated from at least two location determinations for a given wireless device, allowing computation of velocity of the wireless device as a function of the distance the wireless device travels divided by the amount of time elapsed between location determinations.

When a distance vector is computed starting at the first location and ending at the second location a velocity vector may be derived that represents not only where the mobile device is currently located but also the direction in which the mobile device moved, and the velocity at which the device moved.

Some mobile devices even include accelerometer chipsets with which to directly detect motion on three axes of measurement (up-down, side-to-side, and forward-back).

In addition to cell data, some wireless devices are otherwise conventionally able to provide measurements of transmission strength to/from a list of cell towers in addition to the location of the current cell site. This measured power level data in addition to cell data is used to provide an enhanced view of location and movement, in accordance with another embodiment of the invention.

In another aspect, the present invention implements a simple safety interlock by blocking use of certain mobile services if the calculated velocity of a given wireless device exceeds a certain value presumed to correspond with use within a moving vehicle. The need to implement the safety-interlock blockage of wireless services may be determined and implemented by the wireless device, or the service blockage may be determined and implemented within the carrier network.

When the mobile device receives "velocity" and "adult passenger count" from the vehicle, if the velocity is greater than zero (0) and the adult passenger count is less than or equal to one (1) then the mobile device disables the use of mobile services.

```
IF ((velocity > 0) and (adult_passenger_count <= 1)) then
    DISABLE_MOBILE SERVICES
    DISPLAY VISUAL WARNING ON MOBILE DEVICE
END IF
```

Safety is not an absolute. Safety is incremental . . . safety is a matter of probabilities. There is nothing that is "perfectly safe" but many things that have been deemed safe enough for consumption by the general public. Also, it's distinctly possible that dealing with just this one scenario—the solitary adult vehicle occupant scenario—may eliminate enough of the problem domain that no further safeguards are needed.

Every other case is more complex than the "Solitary Adult Vehicle Occupant" scenario.

Difficulty inherent with any "multiple adult vehicle occupants" scenario is determining precisely which occupant is attempting to access mobile services.

The present invention recommends that interoperation between a vehicle's telematics controller 102 and a mobile device be extended such that while inside the vehicle the mobile device communicates only with the vehicle's telematics controller 102 (e.g., via Bluetooth communications) and then the vehicle's telematics controller 102 relays the mobile communication signals to its wireless infrastructure. This yields two desirable end results: (1) The ability to detect which occupant is attempting to use a mobile device; and (2) Improved battery life for the mobile device because the mobile device can temporarily either disable its high power RF circuitry necessary to communicate with cell towers in favor of just its Bluetooth wireless network front end, thus reducing its draw on its own battery power.

The present invention recommends that vehicle telematics systems include several short range, low power interior transceivers in each corner of the vehicle interior for passenger vehicles intended to carry 2 to 6 passengers (see FIG. 1), and ideally also in the middle of the vehicle near the roofline for vehicles meant to carry more than 6 passengers.

Once the telematics controller 102 determines "velocity" or other non-parked condition; and a Boolean value representing "transmission from operator" from the vehicle, if the vehicle is not in 'Park', or if the velocity is greater than zero (0), and the adult passenger count is greater than one (1) and the transmission from operator Boolean is equal to "TRUE" then the mobile device disables the use of Mobile Services.

```
IF ((velocity > 0) and (adult_passenger_count > 1) and
   (XMIT_FROM_OPERATOR = "TRUE")) then
       DISABLE_MOBILE SERVICES
       DISPLAY VISUAL WARNING ON MOBILE DEVICE
END IF
```

A Smart Safety Interlock in accordance with the principles of the present invention may be implemented on large-scale vehicles, e.g., on mass transit vehicles, using the principles of the present invention. For instance:

```
IF ((velocity > 0) and (adult_passenger_count > 1) and
   (XMIT_FROM_OPERATOR = "TRUE")) then
       DISABLE_MOBILE SERVICES
       DISPLAY VISUAL WARNING ON MOBILE DEVICE
END IF
```

Figure 4:
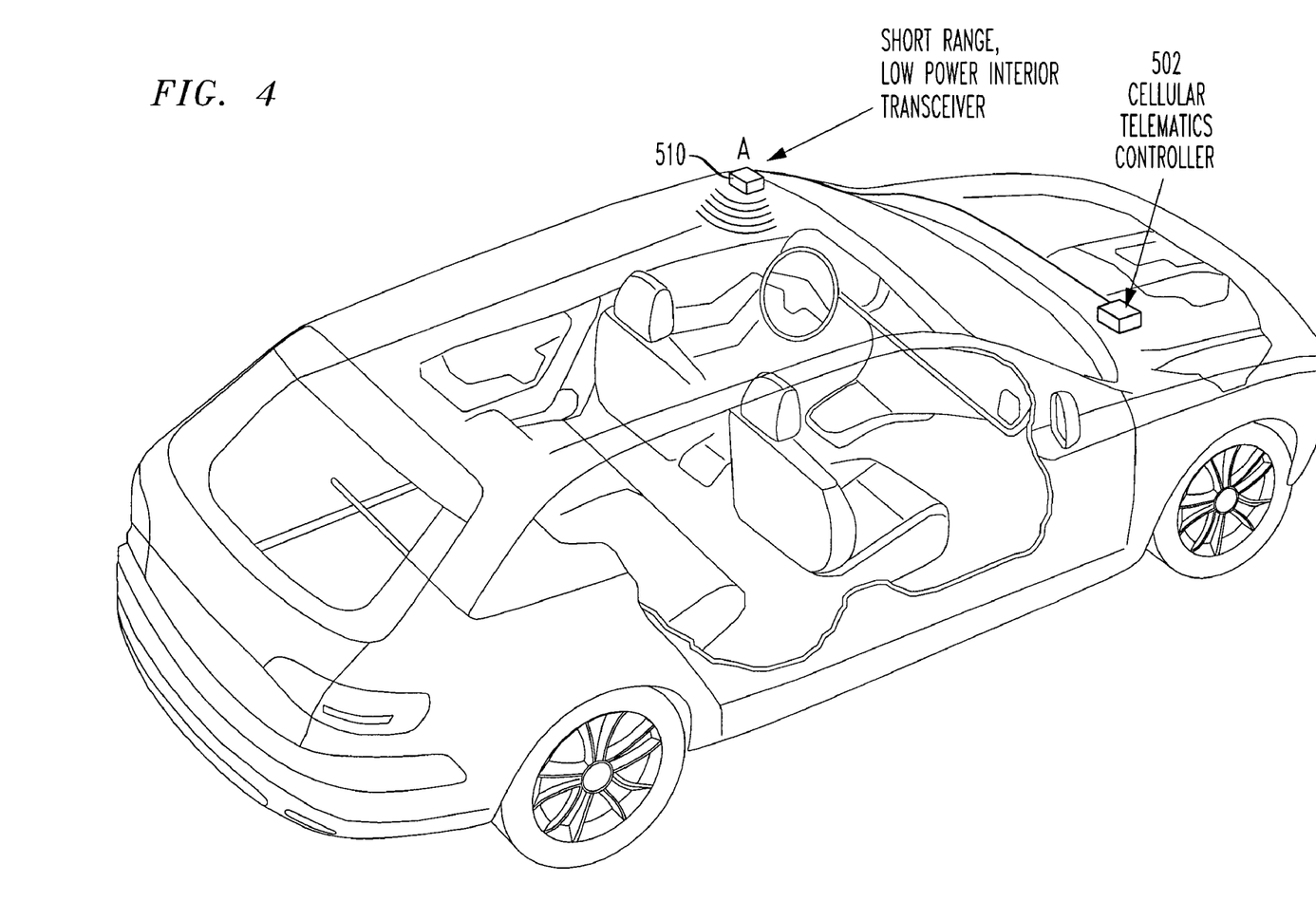
FIG. 4 shows an automobile with another embodiment of the invention wherein a basic mobile safety interlock implements a single short range, low power transmitter, in accordance with the principles of the present invention.

FIG. 4 shows an automobile with another embodiment of the invention wherein a basic mobile safety interlock implements a single short range, low power transmitter, in accordance with the principles of the present invention.

In particular, as shown in FIG. 4, a cellular telematics controller 502 is implemented in a vehicle containing a safety module that causes a safety interlock with a wireless device operated by a driver via a single short range, low power interior transmitter 510.

In this embodiment of the invention, vehicle operation safety is improved without indiscriminately blocking all mobile devices within the vehicle by sending a signal only to the vehicle operator's mobile device, causing only the driver's mobile device to disable mobile services.

In this embodiment, only one telematics transmitter 510 is included in the vehicle's interior. The single telematics transmitter 510 (e.g., a Bluetooth transmitter) is positioned such that the driver will always be the occupant nearest to the transmitter (see FIG. 4).

The signal strength from the single telematics transmitter 510 is carefully attenuated so that only the driver's mobile device will receive the signal and only the driver's mobile device will disable mobile services.

In operation, a safety interlock is triggered in the driver's mobile device by transmitting a block instruction signal from the vehicle's telematics controller 502, via the very short range, low power, small bandwidth communication protocols such as "Bluetooth" transmitter 510. The block instruction signal instructs the driver's mobile device to temporarily disable its mobile services.

The block instruction signal may be qualified by an independent detection that the vehicle is in a driving condition. The driving condition may be determined when the vehicle is started, and its transmission is in a non-parked condition. Alternatively driving may be measured, e.g., when the velocity of the vehicle is detected to be greater than zero (0), thus causing the telematics controller 502 to broadcast a signal through the short range, low power interior transmitter 510 that causes any mobile device within its one seat range to disable the use of mobile services.

```
IF (velocity > 0)
   then
       vehicle telematics begins to broadcast DISABLE_MOBILE
       SERVICES signal
END IF
```

While it's true that this invention is not "safer" than total disablement of all mobile services while any mobile device is in motion presumed to correspond with driving, it enables a vast majority of mobile subscribers to continue to use these mobile services if they aren't the vehicle operator, thus significantly improving safety to a universally acceptable level for all people in a vehicle.

The present invention provides improved mobile device battery life, allowing the vehicle to relay telecommunications to the surrounding cellular infrastructure will allow mobile devices to temporarily (i.e. while aboard the vehicle) reduce transceiver power to minimum settings. This would also provide a reduced risk of any adverse health effects caused by continuous close exposure to higher power RF radiation. Moreover, allowing mobile devices to operate via Bluetooth communications with a vehicle's telematics controller 102 with its own cellular front end turned off or left at a minimum transceiver power setting reduces exposure to RF radiation within the vehicle.

The present invention provides improved management of presence & availability, e.g., by providing the ability to detect whether a mobile device subscriber is currently operating a vehicle, and thus the basis to automatically, by network control, alter that user's "availability" settings to indicate some variant of "unavailable", until the mobile device detects that the vehicle is 'parked' or otherwise no longer being operated by the user of that mobile device.

The present invention to vehicles other than just transportation vehicles. For instance, someone operating a crane or a back-hoe ought not to be sending SMS messages or using other mobile services while operating the vehicle in precisely the same way that a bus driver or someone driving an automobile ought not to be distracted by mobile services.

While the invention has been described with reference to the exemplary embodiments thereof, those skilled in the art will be able to make various modifications to the described embodiments of the invention without departing from the true spirit and scope of the invention.

What is claimed is:

1. A telematics mobile device safety interlock for a vehicle, comprising:
   a short range, low power transmitter mountable within a vehicle, said short range, lower power transmitter having a range of approximately a single seat in said vehicle;
   a telematics controller in communication with said short range, low power transmitter;
   a single seat sensor to detect, via trialateration, occupancy of said single seat; and
   a safety module to trigger a safety mode of operation of said wireless device when said single seat sensor detects occupancy of said single seat.

2. The telematics mobile device safety interlock for a vehicle according to claim 1, wherein:
   said safety module forces said safety mode of operation only if said vehicle is currently being operated by a requestor of mobile services.

3. The telematics mobile device safety interlock for a vehicle according to claim 1, said telematics controller comprising:
   a cellular front end communications module.

4. The telematics mobile device safety interlock for a vehicle according to claim 3, wherein:
   said safety module is triggered via said cellular front end communications module.

5. The telematics mobile device safety interlock for a vehicle according to claim 1, wherein:

said short range, low power transmitter conforms to a Bluetooth protocol.

6. The telematics mobile device safety interlock for a vehicle according to claim 1, wherein:
said short range, low power transmitter utilizes infrared communications.

7. The telematics mobile device safety interlock for a vehicle according to claim 1, wherein said wireless device comprises:
a laptop.

8. The telematics mobile device safety interlock for a vehicle according to claim 1, wherein said wireless device comprises:
a smartphone.

9. The telematics mobile device safety interlock for a vehicle according to claim 1, wherein:
said telematics controller detects attempted use of said mobile device within a driver's seat.

10. The telematics mobile device safety interlock for a vehicle according to claim 1, wherein:
said single seat sensor includes at least three antenna.

11. A method of restricting use of a mobile device in a non-parked vehicle, comprising:
detecting, via a single seat sensor using trilateration, occupancy of a single seat in a vehicle; and
triggering a safety mode of operation of said mobile device when said single seat sensor detects occupancy of said single seat, said safety mode of operation including transmission of a block use instruction, said block use instruction causing said mobile device to temporarily implement restricted use of at least one application on said mobile device from use by a driver of said vehicle.

12. The method of restricting use of a mobile device in a non-parked vehicle according to claim 11, wherein said restriction of use comprises:
prevention of operation of an Email application.

13. The method of restricting use of a mobile device in a non-parked vehicle according to claim 11, wherein said restriction of use comprises:
prevention of operation of a text messaging application.

14. The method of restricting use of a mobile device in a non-parked vehicle according to claim 11, wherein said restriction of use comprises:
forced hands-free mode of operation of said mobile device.

15. The method of restricting use of a mobile device in a non-parked vehicle according to claim 11, further comprising:
communicating between said safety interlock module and said mobile device using a Bluetooth signal.

16. The method of restricting use of a mobile device in a non-parked vehicle according to claim 11, further comprising:
detecting attempted use of said mobile device within a driver's seat.

17. The method of restricting use of a mobile device in a non-parked vehicle according to claim 11, wherein:
said single seat sensor includes at least three antenna.

* * * * *